US011258317B2

(12) United States Patent
Piskorz et al.

(10) Patent No.: US 11,258,317 B2
(45) Date of Patent: Feb. 22, 2022

(54) SYNCHRONOUS GENERATOR

(71) Applicants: Waldemar Piskorz, Kodeń (PL);
Tomasz Tadeusz Piskorz, Kodeń (PL);
Ireneusz Piskorz, Kodeń (PL)

(72) Inventors: Waldemar Piskorz, Kodeń (PL);
Tomasz Tadeusz Piskorz, Kodeń (PL);
Ireneusz Piskorz, Kodeń (PL)

(*) Notice: Subject to any disclaimer, the term of this patent is extended or adjusted under 35 U.S.C. 154(b) by 578 days.

(21) Appl. No.: 16/070,689

(22) PCT Filed: Jan. 18, 2017

(86) PCT No.: PCT/IB2017/000024
§ 371 (c)(1),
(2) Date: Jul. 17, 2018

(87) PCT Pub. No.: WO2017/125814
PCT Pub. Date: Jul. 27, 2017

(65) Prior Publication Data
US 2019/0052133 A1  Feb. 14, 2019

(30) Foreign Application Priority Data
Jan. 18, 2016  (PL) .......................... 415826

(51) Int. Cl.
H02K 1/18      (2006.01)
H02K 21/24     (2006.01)
(Continued)

(52) U.S. Cl.
CPC .............. H02K 1/182 (2013.01); H02K 5/04 (2013.01); H02K 7/183 (2013.01); H02K 21/24 (2013.01); H02K 7/18 (2013.01); Y02E 10/72 (2013.01)

(58) Field of Classification Search
CPC ......... H02K 1/182; H02K 7/183; H02K 21/24
(Continued)

(56) References Cited

U.S. PATENT DOCUMENTS

2006/0022552 A1* 2/2006 Zhu ......................... H02K 7/14
                                                    310/268
2008/0231132 A1   9/2008 Minowa et al.
(Continued)

FOREIGN PATENT DOCUMENTS

CN    102801264    * 11/2012    ............... H02K 1/27
CN    202535183 U    11/2012
EP    2894771 A1     7/2015

OTHER PUBLICATIONS

International Search Report issued for PCT/IB2017/000024 dated May 8, 2017.
(Continued)

Primary Examiner — Terrance L Kenerly
(74) Attorney, Agent, or Firm — Westman, Champlin & Koehler, P.A.; Z. Peter Sawicki; Amanda M. Prose

(57) ABSTRACT

The invention solves the issue of cooling of the power generator by change of its body. According to the invention the generator has a body in the form of open frame structure with polygonal base, made preferably of hollow profiles, connected removably with a clamp, where first stator segments are mounted on threaded pins, connected removably to the arms of the base and arms of the clamp, set on a circle larger than the diameter of a first rotor plate and further rotor plates.

4 Claims, 6 Drawing Sheets

Figure 1:
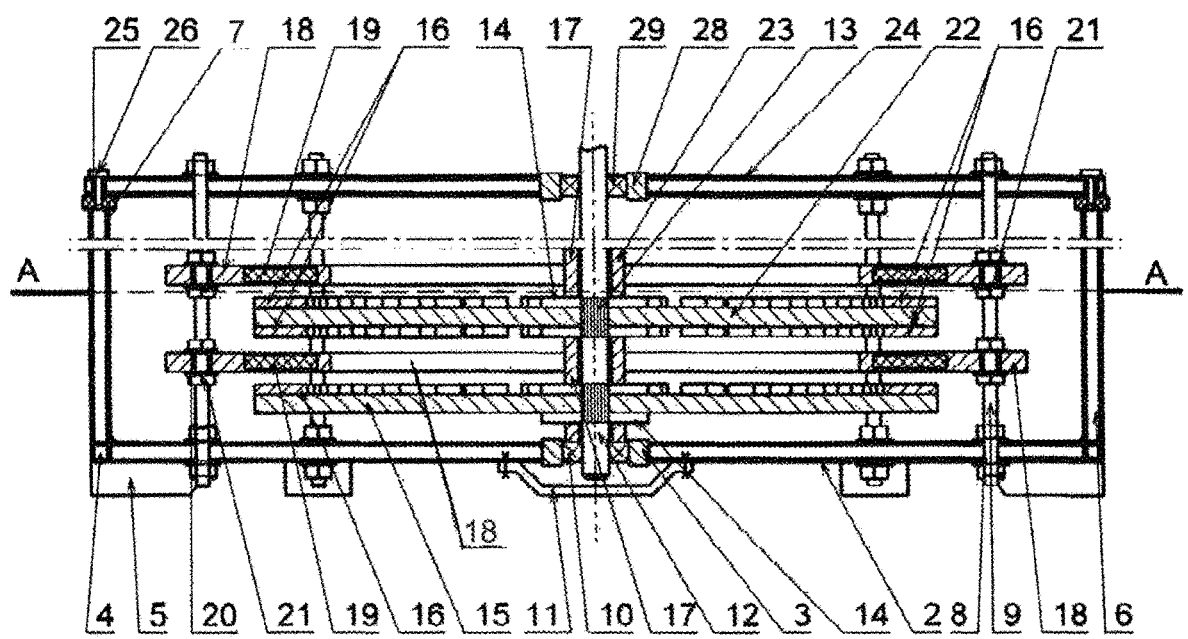

(51) Int. Cl.
*H02K 5/04* (2006.01)
*H02K 7/18* (2006.01)

(58) Field of Classification Search
USPC ...................................................... 310/245.1
See application file for complete search history.

(56) References Cited

U.S. PATENT DOCUMENTS

2014/0265738 A1* 9/2014 Anderson .............. H02K 7/085
 310/60 R
2015/0229173 A1* 8/2015 Sromin .................. H02K 21/24
 310/208

OTHER PUBLICATIONS

Written Opinion of the International Searching Authority issued for PCT/IB2017/000024 dated May 8, 2017.

* cited by examiner

SYNCHRONOUS GENERATOR

CROSS-REFERENCE TO RELATED APPLICATION

This application is a Section 371 National Stage Application of International Application No. PCT/IB2017/000024, filed Jan. 18, 2017, and published as WO2017/125814A1 on Jul. 27, 2017, which claims priority to and benefits of Polish Patent Application Serial No. P.415826, filed with Patent Office of the Republic of Poland on Jan. 18, 2016, the entire contents of which are incorporated herein by reference.

The subject of the invention is a multi-segment synchronous generator, especially for wind turbine.

A multi-plate generator is known from patent description US2008231132, which rotors and stators are positioned alternately in the longitudinal direction in regard to generators shaft. In the plates of the rotors, fixed on the shaft, permanent magnets are attached. Plates of the stator, fixed to the body are equipped with coils positioned opposite to the permanent magnets.

A generator is also known from description CN202535183 that has a body with annular structure. The body has C-shaped indentations, and thus created vanes are inclined towards the interior, facilitating airflow to the generators interior.

According to the invention the generator has a body in the form of open frame structure with a polygonal base, made preferably from hollow profiles, connected removably with a clamp. The first and further segments of a stator are fixed on threaded pins, connected removably to the arms of the base and the arms of the clamp, arranged on a circle larger than the diameter of the plates of a rotor and coaxialy with a main shaft. First segment of the stator is fixed with nuts. First segments of the stator have a winding placed inside of the segment with one external output.

Second plates of the rotor, placed between the first segments of the stator, have permanent magnets fixed on both sides of mentioned second plates.

Alternatively, third rotor plates and fourth rotor plates have at least two rings of the permanent magnets. Additionally fourth rotor plates placed between the second segments have at least two rings of the permanent magnets fixed on both sides.

The second rotor segments have at least two rings of the phase windings, wherein the number of windings is dividable by three. Additionally, the second stator segments are stabilized on the main shaft with third bearings. Each ring of the phase windings has individual current outputs.

First three-phase outlets of the windings of the first ring of all segments of the stator are interconnected in series and/or parallel. Respectively second and further outlets of second and further rings of phase windings are connected separately in serial and/or parallel system. The phase outlets of each further winding ring are a separate power circuit.

Preferably the plates of the rotor and the segments of the stator in open frame housing are made of composite materials.

Putting all of the rotor plates and stator segments in open frame housing significantly improves the working conditions of the generator, as cooling air has access to the stator segments from all sides. During the generators operation there is no overheating of the winding of the stator. Moreover, the construction allows for easy disassembly of parts of the generator in case of malfunction of a segment or rotor plate.

The subject of the invention is shown in an example embodiment where

Figure 2:
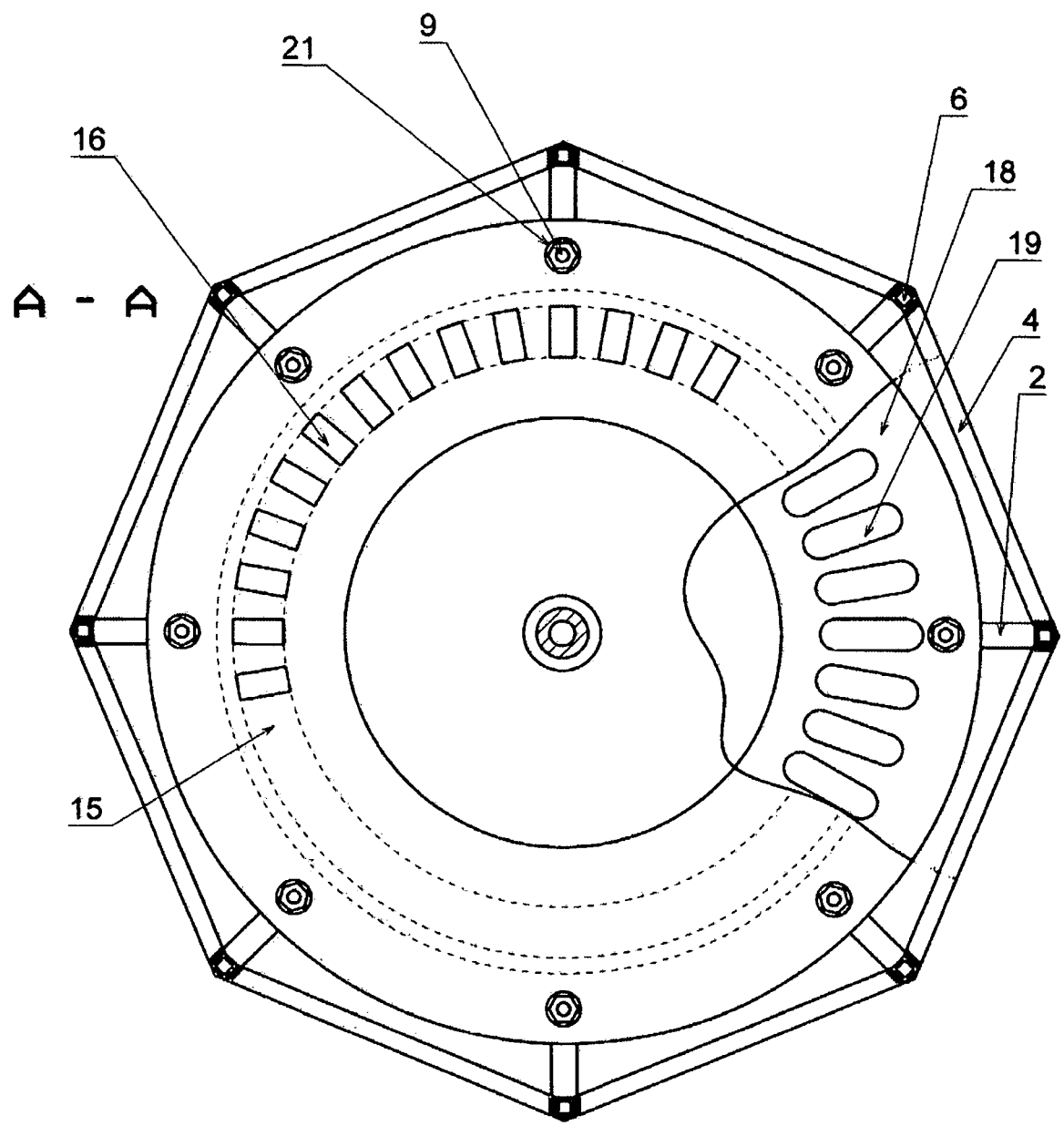
Figure 3:
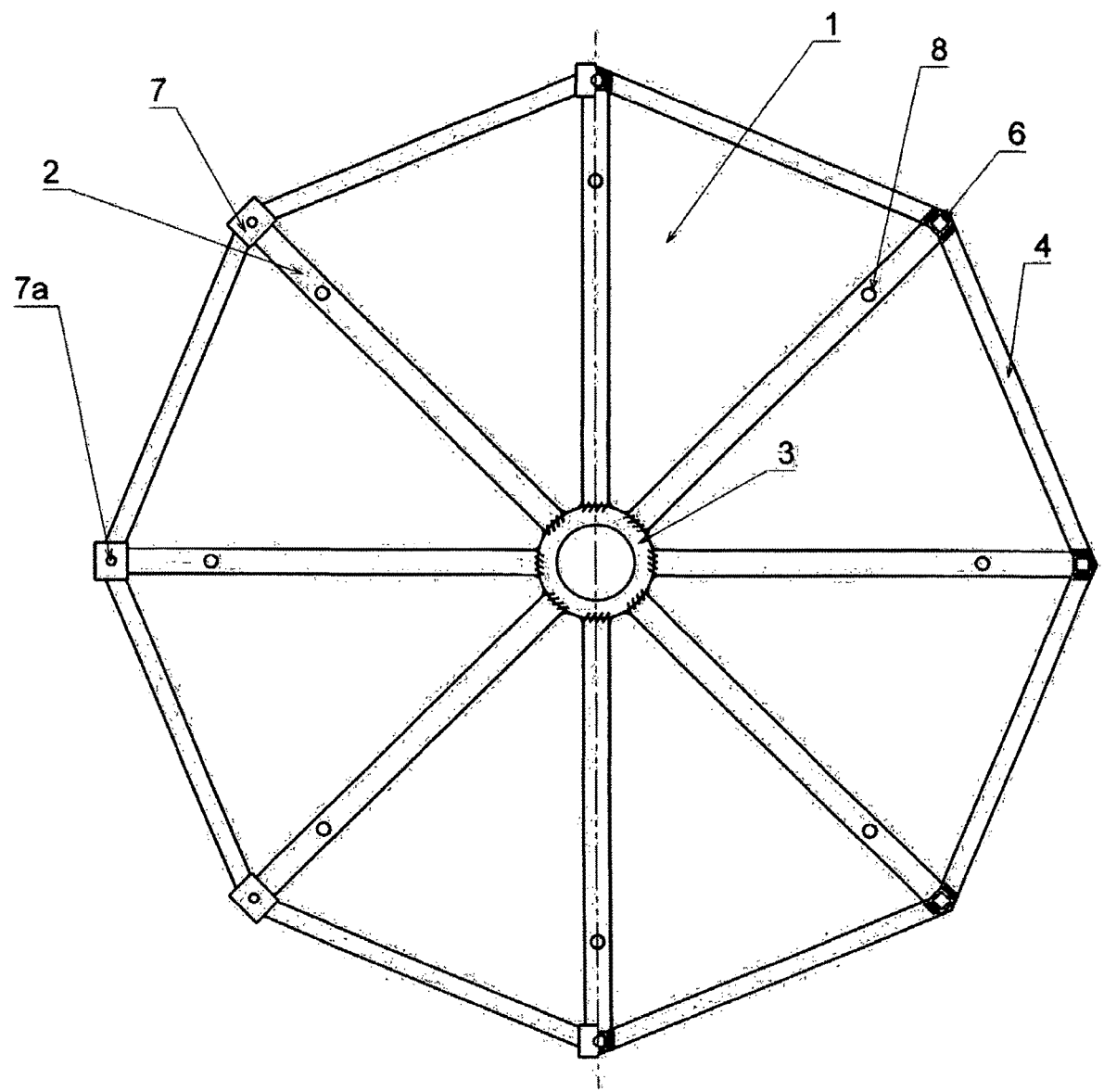
Figure 4:
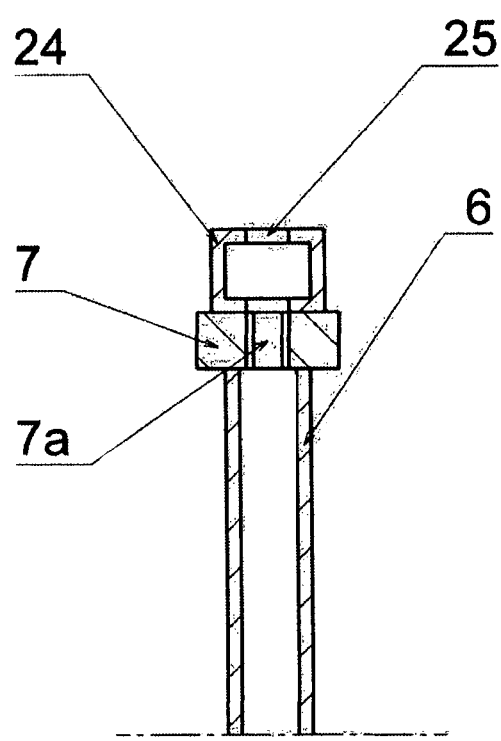
Figure 5:
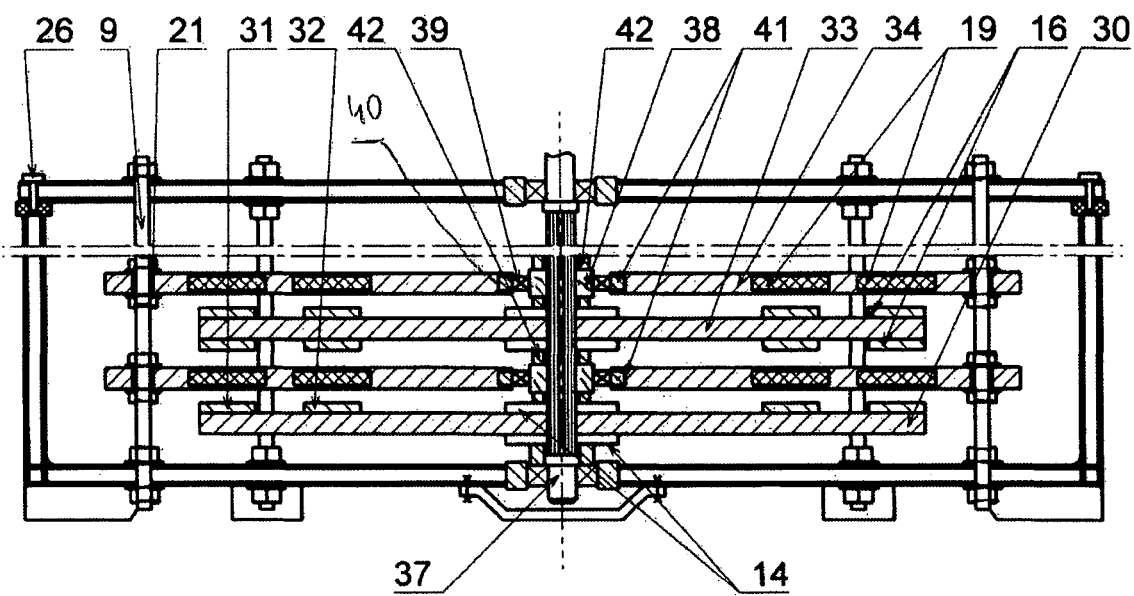
Figure 6:
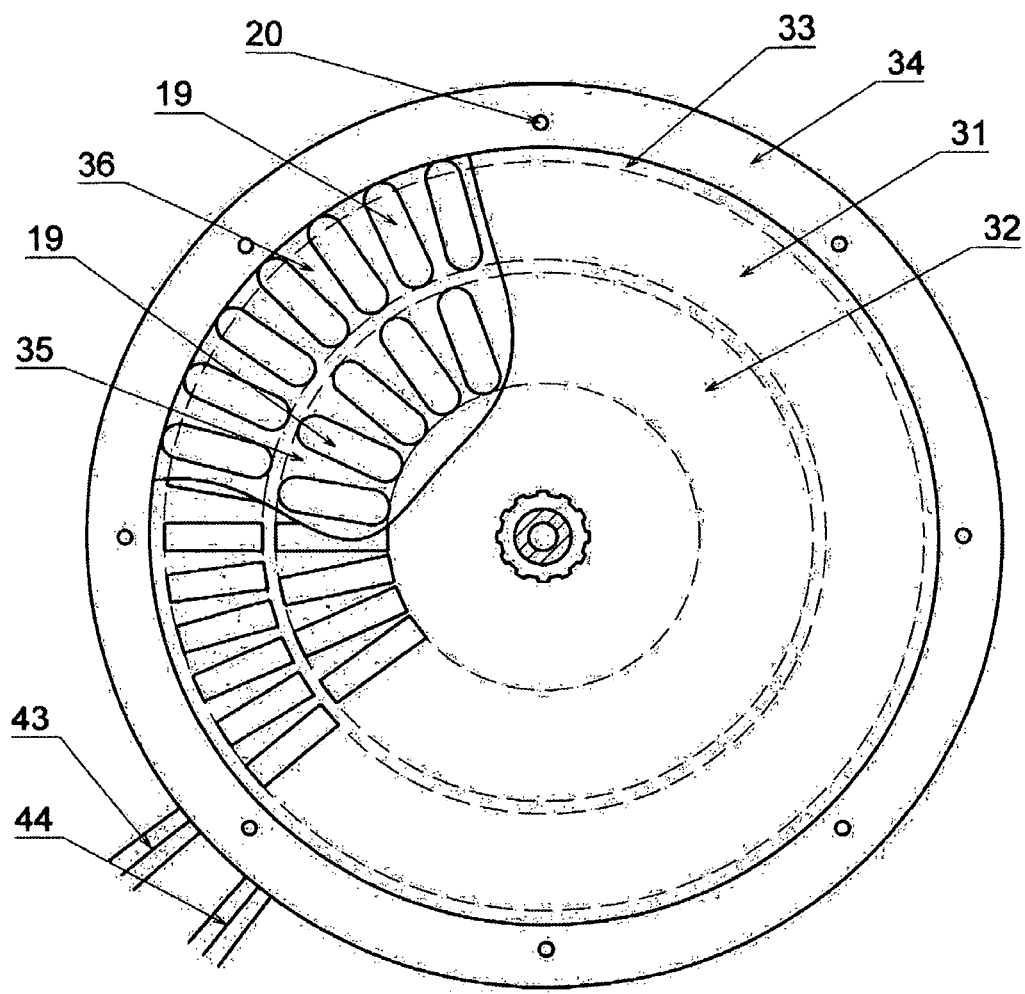

FIG. 1 shows axial section of the generator,
FIG. 2 shows cross-section of the generator,
FIG. 3 half-section and half-view of the open frame housing,
FIG. 4 detail, in enlarged scale, of the section of the ending of the support with a part of the clamp,
FIG. 5 axial section of the generator with segments with two winding rings, and
FIG. 6 cross-section of the generator without the open frame housing, with two magnet rings.

The body of the generator is an openwork frame 1, the base of which are eight arms 2, made from steel hollow profiles placed radially. One end of the arms 2 is welded to the bearing casing 3, and the second end of arms 2 is welded with crossbars 4 placed peripherally and forming an octagon. Arms 2 are equipped with footings 5. In the corners of the base there are supports 6, welded perpendicularly to arms 2 and crossbars 4, said supports are also made from hollow profiles. Ends of the supports 6 have, on their fronts, overlays 7 with threaded first holes 7a. There are second holes 8 in arms 2, arranged on the circumference. In the second holes 8 threaded pins 9 are installed, said pins 9 being perpendicular to arms 2. There is first ball bearing 10 in the casing 3 secured at the bottom with cover U. Main generator shaft 12 is mounted in the first bearing 10, said shaft 12 has coronal multi-projection rings 13 uniformly spaced. Above the bearing 12 there is a pad 14, on which a first rotor plate 15 is based, said plate 15 is equipped with permanent magnets 16 on its periphery and fixed on the multi-projection ring 13. Holes 8 are set on the circle larger than the diameter of the plate 15. There is a spacer sleeve 17, pulled over the shaft 12.

Above the first rotor plate 15 there is a first stator segment 18, made from composite materials with isolated phase winding 19 evenly embedded on the periphery, in an amount dividable by three. Windings 19 are placed on the diameter corresponding to the diameter of the permanent magnets 16 on the first rotor plate 15. There are third holes 20 in the first stator segment 18, which are set correspondingly to position of first holes 8 and pins 9. First stator segment 18 is superimposed on threaded pins 9 and fixed on both sided with nuts 21. Above the first stator segment 18, superimposed on the multi-projection ring 13 of the shaft 12, there is a second rotor plate 22 based on the spacer sleeve 17 with a pad 14. Second plate 22 is equipped with permanent magnets 16 on both sides. Another pad 14 is superimposed on the second plate 22 and is pressed with second spacer sleeve 23. Above the second rotor plate 22 the first stator segment is 18 is set on the pins 9, fixed on both sides with nuts 21. Clamp 24 is placed on overlays 7 on the fronts of supports 6, said clamp 24 having structure similar to the structure of the base of the frame 1, with arms 2 and crossbars 4. On the corners of the clamp 24 there are forth holes 25, through which the clamp 24 is bolted to overlays 7 of the supports 6 with screws 26. There also are second holes 8 on the arms 2 of the clamp 24 in which the ends of threaded pins 9 are fixed on both sides with nuts 21. In the second casing 28 of the clamp 24 there is a second bearing 29 of the shaft 12. Preferably the rotor plates 15 and 22 are made of composite materials.

According to alternative embodiment, the third rotor plate 30 is set by the base of the frame 1, said plate 30 has permanent magnets 16 set on at least two circles 31 and 32. Fourth rotor plates 33, set inside of the casing, have permanent magnets 16 fixed on both sides, also on two circles 31 and 32. Second stator segment 34 has phase windings 19 set on two rings 35 and 36, corresponding to permanent magnets 16 of rings 31 and 32 on rotor plates 30 and 33. The number of windings 19 on circles 35 and 36 is dividable by three. Second stator segments 34 are mounted on the second shaft 37, which has multi-projections on its whole length between bearings 10 and 29, and there are seats 38 of third bearings 39 fixed to said second shaft 37. The periphery of the central hole 40 for third bearings 39 in second stator segments 34 is reinforced with metal insertion 41. Second segments 34, which also have third holes 20, are superimposed on threaded pins 9 and fixed on both sides with nuts 21. On the second multi-projection shaft 37, between stator segments 34 and rotor plates 30 and 33 there are spacer sleeves 42. First three-phase outlets 43 of the windings 19 of the first ring 35 of each stator segment 34 are interconnected in series and/or parallel. The second three-phase outlets 44 of second ring 36 of windings 19 are interconnected in series and/or parallel.

The invention claimed is:

1. A multi-segment synchronic generator having multiple rotor plates with permanent magnets placed evenly on both sides of the rotor plates, wherein the rotor plates are mounted on a main shaft and where the generator comprises multiple stator segments with phase winding evenly set between the rotor plates, characterized in that the generator has a body in the form of an open frame structure of which a base is a regular polygon, made from arms and crossbars, connected removably with a clamp imposed on supports arranged perpendicularly to the arms and crossbars, wherein the stator segments are fixed on threaded pins with nuts on both sides of each stator segment, wherein said threaded pins are arranged to be perpendicular to the arms.

2. The multi-segment synchronic generator according to claim 1, characterized in that the generator is a three-phase generator wherein three-phase outlets of the windings of the stator segments are interconnected in series and/or parallel.

3. The multi-segment synchronic generator according to claim 1, characterized in that the rotor plates are made of composite materials.

4. The multi-segment synchronic generator according to claim 1, characterized in that the stator segments are made of composite materials.

* * * * *